United States Patent [19]

Miller

[11] 4,030,583
[45] June 21, 1977

[54] FAIL SAFE ELECTRIC CONE CLUTCH
[75] Inventor: Donald L. Miller, Horseheads, N.Y.
[73] Assignee: Facet Enterprises, Inc., Tulsa, Okla.
[22] Filed: Sept. 11, 1975
[21] Appl. No.: 612,421
[52] U.S. Cl. .............................. 192/84 C; 192/90; 192/111 A
[51] Int. Cl.² ................... F16D 13/75; F16D 27/10
[58] Field of Search ............... 192/84 C, 90, 111 A; 188/71.8, 71.9, 196 D

[56] References Cited
UNITED STATES PATENTS

| 3,677,377 | 7/1972 | Miller | 192/111 A |
| 3,679,034 | 7/1972 | Miller | 192/111 A |
| 3,724,619 | 4/1973 | Miller | 192/111 A X |
| 3,789,966 | 2/1974 | Miller | 192/111 A |

Primary Examiner—Allan D. Herrmann
Attorney, Agent, or Firm—Remy J. Van Ophem

[57] ABSTRACT

An electromagnetic clutch device for transmitting torque from an input means to an output means. The clutch actuating means includes an electromagnetic means, a driving means, an armature coaxially disposed with the input means and threadedly connected to a driving friction ring member, said armature responsive to said electromagnetic winding and said friction ring member being allowed to adjust with respect to said armature for driving the output means. The relative position between the armature and the driving friction ring member is maintained by a retarder disposed coaxially with the armature. The retarder permits relative rotational motion between the driving friction ring member and the armature in one direction and prevents relative motion between said armature and ring member in the other opposite direction. The fail-safe feature is such that when the electromagnetic means is energized no torque is transmitted from the input means to the output means. Upon failure of the electromagnetic means the clutch becomes engaged and continuously transmits torque from the input means to the output means.

7 Claims, 3 Drawing Figures

FAIL SAFE ELECTRIC CONE CLUTCH

BACKGROUND OF THE INVENTION

The present invention relates to electrically operated friction devices and controls therefor, and more specifically to an electromagnetic self-adjusting clutch which incorporates a fail-safe feature whereby when the clutch is energized, no torque is transmitted and when the clutch becomes de-energized, maximum torque is transmitted from the input means to the output means.

Fail-safe electromagnetic clutch devices have found to be particularly desirable in applications where in case of an electrical power failure it is desirable to insure continuous running of the clutching device in order to complete a cycle or engage the clutch in order to bring a device to a complete standstill and maintain the standstill position. For example, in an electric lift-type truck it would be desirable in the case of an electrical system failure to stop the lift forks in the position that they attained prior to the electrical failure. This would insure that the lift with its heavy load would not drop to the floor in the case of an electrical power failure. Also, in an electric lift truck the fail-safe electromagnetic clutch can be used as a braking device when the truck stalls so that the truck would come to a complete standstill upon electrical power failure or if the engine should stall. Further usage of this type of clutch could be in an elevator where it would be necessary to stop the elevator in case of power failure. The clutch could also be used to control a furnace fan where in case of power failure, one would want the fan to engage and utilize maximum torque in case of an electrical power failure so that the furnace could be properly cooled after an electrical power failure occurs. A fail-safe type clutch is also highly desirable in some automotive applications where the clutch provides a cooling means to either an engine or a transmission. Here, in case of an electrical power failure, the engine or transmission would quickly overheat if there was no cooling available, therefore, the clutch attached with a cooling fan would provide cooling for the transmission even though the electrical system may be malfunctioning. In general, the fail-safe electromagnetic clutch could be used in any application where it would be desirable to temporarily continue an operation of a cycled device after the electrical system has malfunctioned. Likewise, the clutch would be applicable in situations where due to loss of electrical power a function would need to be preformed in order to insure or avoid a major breakdown or disaster.

Such application places particular requirements on the clutch device, in that, generally it must be simple and economically constructed and at the same time provide positive engagement and a high torque output in order to enable the system in which it is utilized to either complete its cycle safely or totally avoid continuation of a cycled event. The clutch in such a system may be either off or on for long periods of time or cycled on or off for short periods of time depending on the output power requirements. Therefore, the clutch must be sufficiently durable to withstand constant use with a minimum amount of wear. Although known electromagnetic clutches have proven to be successful in meeting some of the above requirements, the instant invention is concerned with the compact construction which enables operation of the clutch device to maintain maximum torque output without adverse were effects on the components and further, the invention provides an unlimited wear adjustment of the clutch surface without adversely affecting the force necessary to maintain the output torque.

Heretofore, there have existed at least two recognizable types of electromagnetic clutch construction, one herein called the "cone" variation and the other herein called the "disc" variation. In the cone type construction; inter-engaging friction surfaces between engageable rotatable clutch elements are conically shaped and by their inherent geometric configuration required a lower axial force to develop sufficient frictional locking of the working faces for the rotation of a driven member or for bringing a driven member to a complete standstill. In the disc type construction the inter-engaging friction surfaces are generally disposed normal to the axis of the engageable rotatable clutch elements and in instances where the flux path passes through the working faces, the armature pull is entirely axial. The disc construction is particularly advantageous due to the flexibility for providing large axially directed flux paths and thereby provide for a stronger clutch engaging force.

Other prior art designs are known which combine the desirable characteristics of the two known types of electromagnetic type construction mentioned above. One such design provides an armature ring element which has a generally "L" shaped radial cross section; the element has one annular pole piece with a frustroconical face and another annular pole piece with a flat disc-like face disposed normal to the clutch axis. This design, however, has several disadvantages. For example, since the armature ring element was one piece, there was no means for compensating for wear of either pole piece. Further, with the above mentioned design, the conical friction surface must be made from a magnetic material. Yet another disadvantage results from this design in that the outer magnetic pole force is almost in the radial direction instead of the preferred axial direction.

Another design uses the same principle, that is, threading the conical pole piece to the disc-like pole pieces. This design adds yet one more disadvantage to those listed above in that by forcing the flux path to pass through the thread, there must necessarily be an even greater loss in the generated clutching force.

Fail-safe electromagnetic clutch devices heretofore have been generally of the disc type. Providing a self-adjusting cone type of fail-safe clutch presents the problem of maintaining the fail-safe feature independent of the wear on the frictional surfaces of the clutch. Generally, prior art designs provide conical frictional elements which move into engagement with the mutually engageable conical face on an output member of the clutch. The force required to engage the mutual frictional conical surfaces was a function of the wear exhibited at the mutually engageable surfaces. Therefore, as wear occurred at the frictional surfaces as well as wear occurred on the armature and pole faces, the fail-safe feature would be affected with respect to the amount of force required to pull the clutch into engagement. Generally, prior art designs require greater electromagnetic forces to engage the mutually engageable frictional torque transmitting surfaces as wear occurs at the surface. Further, adjustments for wear on such prior art devices caused adverse wear on the armature faces opposite the pole faces. This was a result of centrifugal force acting on the adjusting means. This centrifugal force caused the adjusting means to be somewhat delayed thereby causing the pole faces of the output member to come into contact with the armature while rotating for a sufficient duration of time to cause adverse wear on the armature face. The problems associated with the adjusting feature naturally affected the fail-safe feature and caused some concern over its effectiveness.

SUMMARY OF THE INVENTION

The present invention relates to fail-safe electromagnetic clutch devices for transmitting torque from an input means to an output means. The input means includes a clutch actuating means comprising an electromagnetic winding, an armature coaxially disposed with the input means and threadedly connected to a driving friction ring member. The driving friction ring member is splined to move axially on an inner body member which is mounted to the input shaft. When the clutch is de-energized, a biasing means moves the friction cone ring member against the output means thus transmitting torque from the friction ring member to the output means. When the electromagnetic winding is energized, a circular flux path is set up between the inner body member and an armature located adjacent to the inner body member. The armature is threadedly connected to the friction ring member. When the electromagnetic winding is energized, the armature pulls the friction ring member away from the output means thereby stopping the transmittal of torque from the input means to the output means. The friction device will maintain this position until the electromagnetic winding is again de-energized. Engagement of the friction ring member to the output means without adverse affect of wear on the armature is caused by a retarder which is disposed adjacent to the armature. The interaction of the driving friction ring member, the armature and the retarder provide for transmitting torque from the input means to the output means without adversely affecting the armature face.

It is a primary object of this invention to provide a fail-safe electromagnetic clutch having high torque load capacity in a clutch housing of substantially smaller diameter.

It is a further object of this invention to provide a fail-safe self-adjusting electromagnetic friction device with wear compensating means that are not adversely affected by centrifugal force and do not adversely affect the high magnetic disengaging force characteristics. Thus, a strong magnetic disengaging force is guaranteed regardless of the wear exhibited by the driving friction ring member which is the prinicpal torque transmitting member. Another object of this invention is to provide a fail-safe electromagnetic clutch in which the electromagnetic disengaging force is unaffected by wearing of the torque carring members.

It is another object of this invention to provide a fail-safe electromagnetic clutch which combines the desirable features of both the disc and cone type electromagnetic friction devices. Thus, the mutually engageable frictional surfaces can be designed to be conical like the cone type of friction device or the engaging frictional surface can be diposed normal to the axis of the engageable rotatable clutch elements.

Still a further object of this invention is to provide a unique and simplified wear adjusting means to automatically maintain the clutch armature in a relatively closed engagement with the electromagnetic pole faces regardless of the wear experience by the torque transmitting friction member and at the same time provide fail-safe feature whereby when the clutch is de-energized, the input torgue is translated totally to the output means through engagement of the friction driving member and when the clutch is energized said transmission of torque ceases.

Another object of this invention is to provide an efficient electromagnetic fail-safe clutch with a new and economical wear compensating means.

Other objects and advantages of this invention will become apparent from the following detailed description taken in conjunction with the accompanied drawings.

DESCRIPTION OF THE PREFERRED EMBODIMENT

Figure 1:
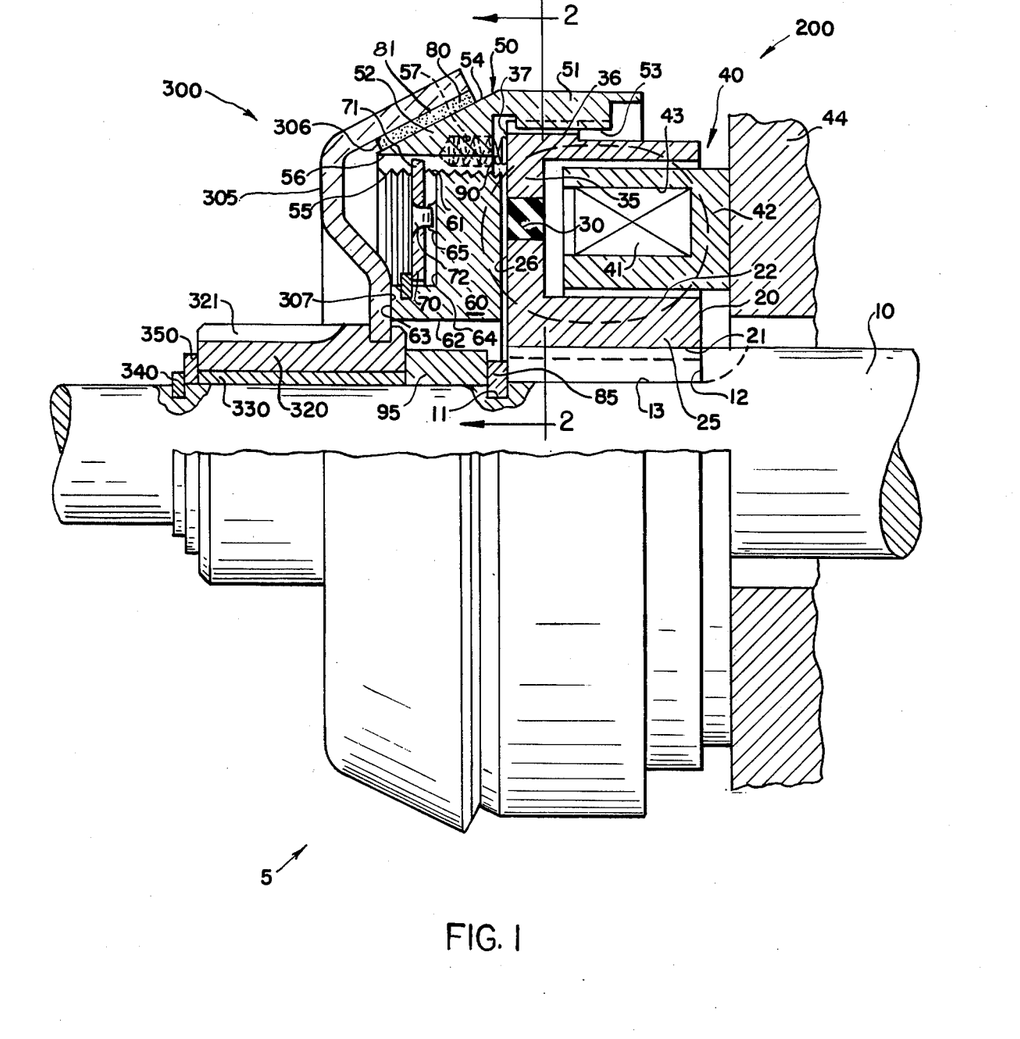
FIG. 1 is a partial sectional view of the preferred embodiment of the invention showing the clutch elements in the engaged position.

Referring to FIG. 1 there is shown a fail-safe electromagnetic friction device 5 adapted to transmit torque from an input means 200 to an output means 300 thereby driving the output means and any elements attached thereto. The output means 300 consists of an output friction member 305 attached to an annular sleeve 320 which is adapted to provide a means for mounting such as the spline shown 321 to provide a positive coupling to some other device which would utilize the rotative power transferred to the output means 300 by the input shaft 10 through the clutching device. The output friction member 305 has a frustroconical surface 306 and an armature adjusting surface 307. The annular sleeve member 320 is mounted to a bearing member 330 in a suitable manner as shown. The bearing member 330 is mounted to the input shaft 10. The bearing member 330 is of a free-wheeling type and is held in position by a lock ring 340 and a spacer ring 350.

The electromagnetic friction device 5 consists generally of a rotatable driving motor input means 200 which is moveable axially to provide frictional engagement with the output means 300. The input means 200 consists of a shaft 10, an inner body member 20, the driving friction cone member 50, an armature 60, a clutch actuating means 40, and a retarder 70. The inner body member 20 is comprised of three concentric annular elements 25, 30, and 35, respectively which form one intergral rotatable body defining an annular cavity 22 coxial with the input shaft 10. In order to establish two separated flux conducting surfaces, the radially inner member portion 25 of the inner body member 20 is separated from the radially outer portion 35 of the inner body member by a nonconductive ring 30. This specific feature of electromagnetic clutches, that is, establishing two poles, is a well known principle in the art.

The nonconductive ring 30 may be manufactured from various nonmagnetic materials, such as stainless steel, brass etc. The annular inner body member 20 is mounted to the input shaft 10 in any conventional way, such as the splines 21 shown, or any other convenient means for providing a positive means of transferring torque without any loss in efficiency from the input shaft 10 to the inner body member 20. The inner body member 20 is secured against axial movement by cooperation of the lock ring 85 mounted in a groove 11 in the input shaft 10. A shoulder portion 12 of the splines 13 on the input shaft 10 provides a surface for the inner body number 22 to engage and establish axial location with respect to the lock ring 85. The mating splines 13 on the input shaft 10 need not be of any definite form providing a form is used whereby torque can be transmitted positively without any loss of efficiency from the input shaft to the inner body member. The relationship of the lock ring 85 and the shoulder locating surface 12 permits the radially inner member portion 25 to maintain proper alignment with the input shaft 10 and also provides proper alignment with the electromagnetic coil housing. The radially outer member portion 35 of the inner body member 20 has a plurality of grooves 36 on its outer most surface. The grooves 36 are intended to provide mutual engagement with a plurality of protrusions 53 on the one end portion 51 of the friction ring member 50.

The radially inner portion 25 of the inner body member 20 has a pole face 26 which is normal to the input shaft axis and parallel to the annular clutch armature 60. The radially outer member portion 35 of the inner body member 20 also has a pole face 37 disposed normal to the clutch axis and parallel to the annular armature 60. The radially outer portion, the radially inner portion, and the nonconductive ring constituting the intergral inner body member is positioned with the respect to the clutch actuating means 40 to provide a continuous flux path upon energizing the electromagnetic winding.

The clutch actuating means 40 comprises an electromagnetic winding or coil 41 and a flux conductive housing 42 for the electromagnetic winding 41. The electromagnetic winding, or coil 41, is disposed within a cavity 43 of the housing and is contained therein by any suitable adhesive, such as epoxy. The coil 41 may be manufactured from copper wiring or other suitable material and is suitably connected to a DC power source and an electrical control means (not shown). The housing 42 is axially fixed 44 and nonrotatably mounted with respect to the input shaft 10. The positioning of the clutch actuating means 40 and the annular cavity 22 provided by the integral inner body member 20 results in a continuous flux path to be formed upon energizing of the coil 41. The flux path is set up from the coil to the radially outer portion pole face, 37 to the armature 60, to the radially inner portion pole face 26 and returning to the electromagnetic winding or coil.

The principal torque transmitting member is an annular frustro-conical friction ring member 50 having one end portion 51 coaxially mounted with the inner body member 20 and an opposite end portion 52 adjacent said inner body member. The friction ring member is permitted to move axially with respect to the inner body member by a plurality of axial grooves 53 or splines along the one end portion 51 of the friction ring's inner diameter. The axial grooves 53 or splines cooperate with the inner body member grooves or splines 36 to provide axial movement of the friction ring member 50 with respect to the inner body member 20. The opposite end portion 52 of the friction ring member 50 has an outer surface 54 which is frustroconical in cross section. To this frustro-conical outer surface is mounted a friction material 80 using any suitable adhesive or mechanical bond. The friction material 80 is adapted to frictionally engage with a mutually engageable frustro-conical surface 306 of the output friction member 305 of the output means 300. The cylindrical internal surface of the opposite end portion of the friction ring or cone member 50 is entirely threaded 55 therealong. This surface also has a plurality of axial grooves 56 on its inner diameter for a purpose later to be set forth. Since the friction ring member is not in the flux path of the electromagnetic clutch, the cone member may be fabricated from a wide selection of magnetically nonconductive materials or a friction material can be attached to the friction ring member by a mechanical or adhesive bond, such as the one shown in the preferred embodiment. The friction material in the preferred embodiment is organic material; thus, clutch torque, clutch life and operational noise is optimized to an extent never before possible even with clutches of a similar design.

The opposite end portion 52 of the friction ring member 50 further has a plurality of cavities 57 which are adapted to receive a plurality of biasing members, i.e., compression springs 90. The biasing members are interposed to act directly and indirectly between the inner body member 20 and the friction ring member 50. The biasing members may also be positioned to act between the inner body member 20 and the armature 60. The preferred embodiment is shown with a plurality of compression springs 90 mounted between the friction ring member 50 and the inner body member 20. The biasing members are mounted to act upon the friction ring member and to move the friction ring member 50 into engagement with the output means 200 when the electromagnetic winding 41 is de-energized. The biasing members exert a force upon the friction ring member in the energized condition in a direction away from the pole faces 26, 37 so that when the electromagnetic winding is de-energized, the spring force of the biasing members moves the friction ring member and the armature as well as the retarder in an axial direction away from the pole faces. This movement causes the mutually engageable friction surfaces to engage thereby transmitting torque to the output means. This illustrates the fail-safe feature of the invention. Upon de-energizing the electromagnetic coil, or in other words, a loss of electrical power to the magnetic winding, whether through a power failure or manual control of the electrical power, the clutching surfaces are moved into engagement under the influence of the biasing force and remain in engagement until the electrical power is again restored or until electrical power is again allowed to energize the electromagnetic winding.

An annular armature 60 is mounted between the friction ring member 50 and the inner body member 20. The armature 60 has a radially outer surface threaded 61 along its entire length. The thread 61 cooperates with the thread 55 on the friction ring member and, therefore, the armature is mounted so as to be received within the threaded surface 55 of the friction cone member. The inner most diameter 62 of the armature ring 60 terminates in a face at one end which has an adjusting surface 63 upon which the output friction member 305 acts when the armature is electromagnetically de-energized. Upon de-energization, the friction ring member 50 and armature 60 are moved towards the output means 300 to begin translating torque from the input shaft to the output means. A second face 64 is provided which has a knurled portion 65 for a purpose later to be described. As stated above, when the electromagnetic force is removed, the force generated by the biasing members 90 acts in the axial direction to engage the friction ring member 50 with the output means 300. This same axial force disengages the armature 60 from the pole faces 37, 26 and causes the armature to come into contact with the output friction member adjusting surface 397. The adjusting feature of the electromagnetic clutch device is obtained through the interaction of the output friction member adjusting surface 307 and the armature adjusting surface 63. As the friction ring member and the armature more towards the output friction member 305, the rotational velocity of the armature is decreased at the armature adjusting surface by the static condition of the output means. The friction ring member, which continues to rotate at the input shaft speed through the inner body member splines 36, is caused to move axially forward in a direction towards the output means along the mutually engageable threads 55, 61 between the friction ring member and the armature due to a small difference in rotational speed between the armature and the friction ring member. The friction ring member continues to advance until the friction engaging surface 81 of the driving friction ring member and the friction engaging surface 307 of the output friction member come into engagement. Simultaneously, as the armature threads itself along the friction ring member, the torque is transferred from the friction ring member to the output means through the mating frictional surfaces of the respective members.

The armature is allowed to thread itself with respect to the friction ring member in one direction and prevented from rotating in an opposite direction by the use of a retarder member 70. The retarder member 70 has a plurality of tabs 71 on its outer diameter corresponding to the plurality of grooves 56 on the inner surface of the opposite end portion of the friction ring member. The retarder is allowed to move axially with respect to the friction cone member but nonrotatably. Between the inner and outer diameter of the annular retarder are located a plurality of spring-like fingers 72 biased to provide a force in a direction towards the pole faces 26, 37. These spring-like fingers come into contact with the knurl 65 on the second face 64 of the armature. The knurl on the second face of the armature is manufactured in such a way whereby the armature will thread itself along the mutually engageable threads on its outer surface when rotated in one direction, with respect to the retarder member, but will be prevented from rotating in the opposite direction by the spring-like biased force of the fingers which act like a rachet upon the knurled portion of the second face of the armature. Therefore, the spring-like fingers will allow the armature to rotate with respect to the friction cone and retarder in one direction but not in an opposite direction. The overall effect of the action between the spring-like fingers 72 and the knurled surface of the second face of the armature is to avoid movement of the armature with respect to the friction ring members except as wear of the friction material occurs. As wear occurs on the friction material, the armature threads itself along the inner diameter of the friction cone. The action of the retarder fingers on the knurled portion of the second face of the armature comprises the self-adjusting wear compensating feature of this invention. It should be noted that the retarder fingers can be provided in either direction and obtain the same retarding effect. The armature shown on the preferred embodiment is in a disengaged mode with the friction cone being fully advanced towards the output friction member. It will be noted that the armature and retarder adjusting means will allow the armature to thread itself completely into the friction ring member and thereby use the full extent of the friction material mounted to the friction cone without any adverse effect upon the torque output of the friction device or without adverse wear to the armature pole faces of the inner body member. Any suitable annular spacer 95 may be provided between the output means 200 and the inner body member in order to locate the output friction member with respect to said inner body member.

Figure 2:
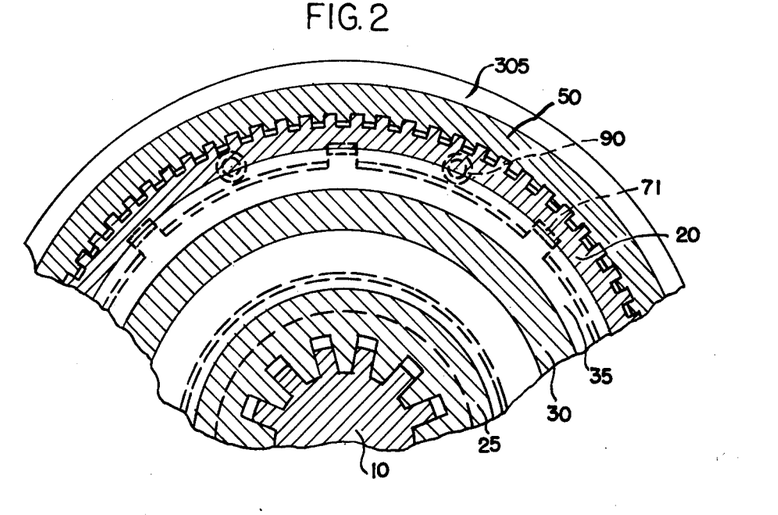
FIG. 2 is a fragmentary sectional view taken along section 2—2 in FIG. 1 showing the inter-related means of the armature, friction cone ring member and inner body member.

FIG. 2 illustrates the interrelationship of the friction ring member 50, inner body member 20, and input shaft 10. The biasing means 90 are radially dispersed so as not to interfere with the mutually engageable threads. The splines shown at the input shaft to inner body member mounting as well as the inner body member to friction ring member are only for illustrative purposes and are not intended to be limiting. Any convenient mutually engageable coupling which permits relative axial movement without rotatable movement may be used.

Figure 3:
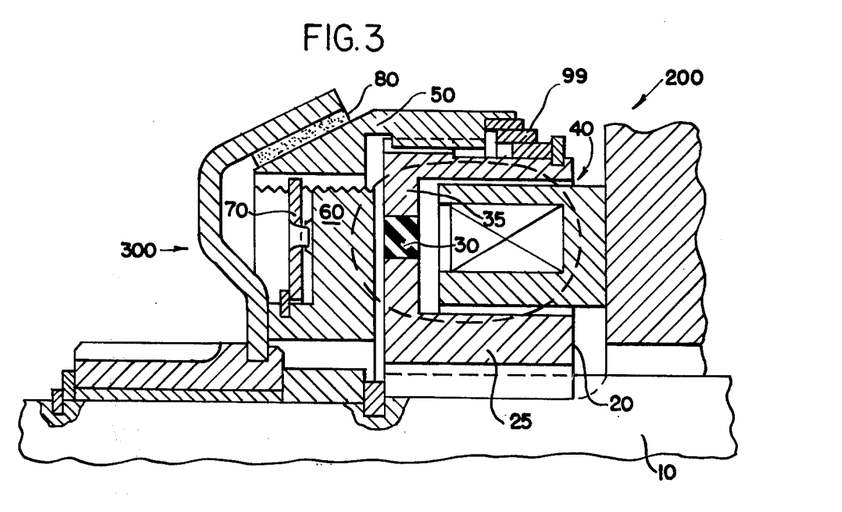
FIG. 3 is a partial sectional view of an alternate embodiment of the invention showing use of a conical spring biasing the driving friction ring member.

In FIG. 3 another embodiment of the invention is illustrated. This embodiment is shown to illustrate the use of a conical spring 99 mounted to the other portion of the inner body number instead of the compression spring between the inner body member and the driving friction ring member. The remaining numerals not called out are the same as those of FIG. 1.

OPERATION

In operation, when the electromagnetic winding is energized, the armature 60 is moved axially into engagement with the pole faces 26, 37 of the inner body member 20. The magnetic engaging forces exerted on the armature are completely axial and therefore provide a closed contact between the pole faces and the armature. Under this energized condition the driving friction ring member 50 remains axially spaced apart from the mating surface 306 of the output means 300 and the biasing means 90 is acted upon by the friction ring member and the armature and the friction ring member moves axially towards the inner body member. The armature and friction ring member in the energized condition are under the influence of a compression spring force which acts in a direction towards the output means. In this energized state the inner body member, armature and friction ring member will continue to rotate at the speed of the input shaft. The ouput means may come to a standstill upon energizing the electrommagnetic winding.

Upon losing power in the electromagnetic circuit, the compression spring force between the inner body and the friction ring member causes the friction ring member 50 to move axially towards the output means 300. As the friction ring member 50 and the armature 60 moves towards the output means, the rotational velocity of the armature is decreased at the armature adjusting surface 63 by the static condition of the output means. The friction ring, which continues to rotate at the input shaft speed through the inner body member splines 36, is caused to move axially forward along the mutually engageable thread 55, 61 between the friction ring member and the armature towards the output means due to the small difference in speed between the armature and the friction ring member thereby advancing the friction surface 81 of the driving friction ring member into engagement with its mating surface 306 of the output means. Simultaneously, as the armature threads itself along the friction ring member, almost all of the torque is transferred from the friction ring member to the output means through the mating frictional surfaces 81, 306 of the respective members. The adjustment between the armature and friction ring member will continue until maximum torque is transmitted through the mutual frictional surfaces. This initial adjustment only occurs the first time that the clutching surface is engaged. From this time forward no additional adjustment occurs between the armature and the friction ring member unless wear is exhibited at the mutual friction surface. Upon wearing of these surfaces, the armature will again, when becoming de-energized, adjust itself with respect to the friction ring member and the armature adjusting surface of the output means until such time that maximum torque can be transmitted through the clutching device. The armature and friction cone member, with respect to each other remain in exactly the same position as in the prior de-energized position.

When the electromagnetic winding is again energized, the armature 60 and the driving friction ring member 50 are axially withdrawn from the output means under the influence of the electromagnetic force applied by the electromagnetic coil. Upon becoming disengaged from the output means, the armature and friction cone member rotate at the same speed as the input shaft. Relative motion between the two elements is not possible due to the nature of the design of the retarder member. The fingers 72 of the retarder act upon the knurled surface 65 of the armature in such a way as to prevent relative movement between the armature and friction ring member upon energizing of the electromagnetic coil. The armature and friction ring member, with respect to each other, therefore, remain in exactly the same position as in the prior energized position. Therefore, when the electromagnet is again energized, the armature and friction ring member will move towards the output means and the frictional surfaces respectively and the same basic relative position between the frictional surface on the output member and the friction material surface of the cone member is reestablished.

The retarder members will only permit the armature to rotate in one direction relative to the friction cone member; the only way relative motion between the friction cone member and the armature will be permitted to occur after its initial adjustment is when the frictional surface wears away. As wear occurs, the same basic cycle described above is repeated and continues to occur until all of the frictional material wears away. Note that as wear occurs, there is no loss of torque between the input and output means. The movement between the armature and the driving friction ring member is immediate and automatically adjusts the position of the friction ring member to compensate for any wear that occurs at the frictional surfaces.

While a preferred embodiment of the invention has been disclosed, it will be apparent to those skilled in the art that changes may be made to the invention as set forth in the appended claims and in some instances, certain features of the invention may be used to advantage without corresponding use of other features. For example, the clutching device can easily be used as a braking device with little or no changes in the basic concepts of the invention disclosed. Accordingly, it is intended that the illustrated and descriptive materials herein be used to illustrate the principles of the invention and not limit the scope thereof.

What is claimed is:

1. An electromagnetic device for transmitting torque comprising:
    input means;
    output means coaxially disposed with said input means;
    means for driving said output means, said driving means transferring torque from said input means to said output means, said driving means further comprising:
    an adjustable friction ring member;
    an inner body member coaxially disposed with said friction ring member for rotational movement therewith; and
    means for biasing said adjustable friction ring member into engagement with said output means;
    means for electromagnetically actuating said friction device, said actuating means disposed with respect to said inner body member to form a circuitous flux path, said actuating means comprising:
    a magnetic armature; and
    means for adjusting said armature with respect to said inner body member; whereby when said electromagnetic means is energized a circuitous flux path is formed between said armature and said inner body member;

2. An electromagnetic friction device, as recited in claim 1, wherein said input means comprises a power driven shaft;

3. An electromagnetic friction device, as recited in claim 1, wherein said means for biasing said friction ring member includes:
    a compression spring mounted between said friction ring member and said inner body member; and
    means for mounting said friction ring member to said armature, said means enabling axial and rotational movement of said ring member with respect to said armature;

4. An electromagnetic friction device as recited in claim 3, wherein said compression spring is a conical spring;

5. The electromagnetic friction device, as recited in claim 4, wherein said mounting means comprises a helical thread on the inside diameter of said friction ring member;

6. An electromagnetic friction device for transmitting torque comprising:
    an input shaft;
    output means coaxially disposed with said input shaft and free to rotate thereon, said output means adapted to translate torque;
    an inner body member coaxially disposed with said input shaft for rotation therewith; said inner body member having an inside diameter adapted to mount to said input shaft, an outside diameter having means for translating torque and a plurality of pole faces between said inside and outside diameters;

a friction ring member coaxially disposed with said inner body member, said friction ring member having one end portion and an opposite end portion; said one end portion having means for engaging said inner body member, said engagement means adapted to cooperate with said translating means of said inner body diameter said opposite end portion having means for frictional engagement adapted to engage said output means;

clutch actuating means mounted adjacent to said output means, said actuating means including:

an electromagnetic winding;

an armature coaxially disposed with said input shaft opposite said pole faces of said inner body member, said armature being movable axially toward and away from said pole faces of said inner body member in response to said clutch actuating means, said armature further having an outer helical threaded surface and a serrated face portion normal to said outer helical threaded surface;

means for biasing said friction ring member into engagement with said output means, said biasing means maintaining the electromagnetic friction device into engagement when said electromagnetic winding is deenergized; and an annular retarder member disposed coaxially with said armature, said retarder member having second means for biasing said armature, said second biasing means allowing rotational movement of said armature in one direction and preventing rotational movement of said armature in another opposite direction, whereby said clutch actuating means produces a circuitous flux path when energized, said flux path passing through said pole faces and said armature moving said armature into engagement with said pole faces, said armature being threadably engaged with said friction ring member such that upon engagement of said armature with said pole faces of said inner body member, said armature moves rotatably on said helical thread towards said inner body member to compensate for the wear occurring at the frictional clutch surfaces, said retarder maintaining the relative position established between the armature and inner body member when said clutch actuating means is de-energized and said biasing means engage said output means;

7. In combination with an electromagnetic clutch of the type wherein torque is transmitted from an input means to an output means upon de-energizing of an electromagnetic coil means and wherein an armature is disposed coaxial with said clutch axis adjacent magnetic pole faces on the input means, said armature having an outer helical threaded surface, the improvement comprising:

an annular friction ring member having one end portion and another end portion, said one end portion having a torque transmitting means for imparting rotational motion to said annular friction ring member; said other end portion having an inner helical threaded surface adapted to engage the helical threaded surface of said armature and a plurality of angularly spaced axial grooves to provide axial movement of said friction ring member with respect to said armature;

means for biasing said friction ring member in a direction away from said pole face of said input means, said means adapted to engage the annular friction ring member with the output means upon de-energizing the electromagnetic coil; and an annular retarder member disposed coaxially with said armature, said retarder having means for biasing said armature whereby said biasing means allows rotational movement of said armature in one direction and prevents rotational movement of said armature below a predetermined level in another opposite direction;

whereby upon de-energizing said electromagnetic coil means said friction ring member engages said output means and the relative position between said armature and said friction ring member is maintained by said retarder member until the electromagnetic coil means again becomes energized.

* * * * *

UNITED STATES PATENT OFFICE
CERTIFICATE OF CORRECTION

PATENT NO. : 4,030,583
DATED : June 21, 1977
INVENTOR(S) : Donald L. Miller

It is certified that error appears in the above-identified patent and that said Letters Patent are hereby corrected as shown below:

Column 1, line 50, following "be" delete "preformed" and insert --performed--;

Column 1, line 68, following "adversed" delete "were" and insert --wear--;

Column 5, line 11, following "number" delete "22" and insert --20--;

Column 7, line 13, following "surface" delete "397" and insert --307--;

Column 7, line 17, following "armature" delete "more" and insert --move--;

Column 8, line 59, preceding "winding" delete "electrommagnetic" and insert --electromagnetic--.

Signed and Sealed this

Eleventh Day of October 1977

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,030,583
DATED : June 21, 1977
INVENTOR(S) : Donald L. Miller

It is certified that error appears in the above-identified patent and that said Letters Patent are hereby corrected as shown below:

Column 10, line 36, following "member" delete the semicolon (;) and insert a period (.);

Column 10, line 39, following "shaft" delete the semicolon (;) and insert a period (.);

Column 10, line 48, following "armature" delete the semicolon (;) and insert a period (.);

Column 10, line 51, following "spring" delete the semicolon (;) and insert a period (.);

Column 10, line 55, after "member" delete the semicolon (;) and insert a period (.);

Column 12, line 5, following "means" delete the semicolon (;) and insert a period (.).

Signed and Sealed this

Twenty-ninth Day of November 1977

[SEAL]

Attest:

RUTH C. MASON
Attesting Officer

LUTRELLE F. PARKER
Acting Commissioner of Patents and Trademarks